UNITED STATES PATENT OFFICE 2,202,252

PREPARATION OF METALLIC OXIDES

Ewald Herzog, Berlin, Germany, assignor to Deutsche Gold und Silber Scheideanstalt, Frankfort-on-the-Main, Germany, a corporation of Germany No Drawing. Application July 27, 1938, Serial No. 221,601. In Germany July 28, 1937

11 Claims. (Cl. 23—184)

In the preparation of the oxides of sodium particularly sodium monoxide, $Na_2O$, and sodium peroxide, $Na_2O_2$, it is now usual to react metallic sodium with an oxidizing gas in the presence of an excess of solid sodium monoxide. A definite amount of sodium monoxide prepared as the result of previous operations is permitted to remain in or is charged ordinarily into a rotary tube furnace which may be provided with a stirring device. Metallic sodium in relatively small amount based on the amount of sodium monoxide present, preferably from 1 to 2% based on the weight of the sodium monoxide present as diluent, is then fed into the reaction vessel. The mixture is agitated generally by rotation of the rotary tube (or sometimes by means of a stirring device) and an air current which, preferably, has previously been freed of moisture by drying is passed over the heated mixture. The temperature of the sodium monoxide and metallic sodium in the rotary tube furnace is maintained within the temperature range 120–230° C. The metallic sodium is converted to sodium monoxide and the process is advantageously operated in such a manner that additional metallic sodium is added in portions after oxidation of the greater part of the first portions of metal added. The completely oxidized charge is partially removed from time to time, and the remaining amount of sodium monoxide utilized as diluent during the oxidation of additional amounts of metallic sodium.

A process for the manufacture of sodium monoxide in this manner is described in Carveth Patent No. 1,638,471 issued August 9, 1927, in which process, however, a rotary heated tube is not employed. It may be remarked that in accordance with known procedures the sodium monoxide thus formed can be further oxidized to sodium peroxide by treatment at elevated temperatures with oxidizing gases.

The process as described in the patent literature and practiced in the art yields a product which is more or less pulverulent in nature. The fine powdery material is difficult to handle and, moreover, when further oxidized to sodium peroxide, it yields another pulverulent product, one containing a considerable amount of fine, powdery material. When these pulverulent products are utilized commercially, such as by introducing them into aqueous agents in order to produce a bleaching solution, the dusty or powdery nature of the products tends to bring about its suspension in the air, thereby creating much discomfort to workmen engaged in handling the powdery oxides of sodium. Sodium peroxide of powdery nature when introduced into an aqueous medium to form bleach baths is more difficult to dissolve and usually results in loss of active oxygen.

It is one of the objects of this invention to prepare sodium monoxide and sodium peroxide in practically dust-free form, a form in which the sodium monoxide or sodium peroxide comprises a plurality of approximately spherical granules or pellets. The new product, which it is an object of this invention to prepare, contains relatively little powdery material and because of its globular nature is relatively easily handled by workers preparing commercial solutions from these products. The preparation of these oxides of sodium in globular form and the elimination of practically all of the dust or powdery type of product characteristic of the prior art is the principal object of my invention.

It has been found that it is possible to secure sodium monoxide, $Na_2O$, in substantially dust-free form, and in the form of globular pellets by utilizing as the diluent material during the oxidation of metallic sodium to the monoxide state a charge of sodium monoxide which in form comprises a plurality of pellets of approximately spherical or globular shape. These globular pellets or fine beads may advantageously be secured as the result of previous operations wherein the sodium monoxide is manufactured.

The process is carried out by charging the rotary tube furnace with the spherical beads of sodium monoxide and then adding thereto metallic sodium in relatively small percentage, preferably 1 to 2 parts by weight of metallic sodium per 100 parts of the globular sodium monoxide. Air which has previously been dried and purified is preferably utilized as the oxidizing agent. The rotary tube furnace and its contents are heated to provide a substantially uniform temperature, the temperature being preferably maintained within relatively narrow limits, i. e. 180 to 230° C. Care is taken to insure the maintenance of relatively uniform conditions of heating so that the temperature does not exceed about 230° C. If desired, external heating of the rotary tube furnace can be eliminated by regulating the amount and rate of addition of fresh sodium metal and the rate of addition and amount supplied of air or other oxidizing gas, so that undesirable overheating of the reaction mixture is avoided. The avoidance of overheating is of considerable importance, as overheating tends to produce crusts which will normally form a product of undesirable powdery or pulverulent form.

Although the mechanism by which sodium monoxide in globular or pellet form is produced is not fully understood, it appears that there are two factors, at least, tending to bring about the formation of the monoxide product in the desired substantially spherical form. First, due to subdivision of the metallic sodium fed into the reaction vessel, by rotation of the rotary tube, agitation, or otherwise, the liquid metallic sodium, coated with an adherent layer of sodium monoxide, is gradually reduced in size, the particles always remaining globular in form, until the metal is all converted to monoxide of the desired pellet form. The second apparent reason for the formation of dust-free sodium monoxide in globular or pellet-like form is that the newly formed sodium monoxide resulting from oxidation of the metallic sodium appears to deposit on the small beads of monoxide originally present in the rotary tube or other reaction vessel. Occasionally crusts may form as the result of local overheating of part of the charge and, in this event, it is advisable to remove the crust from the walls as quickly as possible in order to prevent it from growing in size and forming pulverulent material.

As an example of one method of carrying out my process for the manufacture of sodium monoxide in the form of globular masses of pellet-like or approximately spherical shape, the following may be given.

An amount of sodium metal corresponding to approximately 2% by weight of the sodium monoxide present as diluent is introduced into a rotary tube furnace wherein the diluent sodium monoxide is in the form of small fine-grained pellets of approximately globular or spherical shape. Air which has previously been dried and freed from undesirable impurities is utilized as the oxidizing agent. After all or a portion of the sodium metal introduced has been oxidized to sodium monoxide, for example after oxidation of approximately half of the sodium metal originally introduced, or oxidation of substantially all initially introduced, a second portion of metallic sodium is added. This process is continued, fresh portions of metallic sodium being added after oxidation of all or part of the metallic sodium introduced in the previous addition. From time to time the sodium monoxide is removed from the rotary tube furnace and withdrawn for packaging and storage.

It has been found advantageous to introduce into the rotary tube furnace substantially equal amounts of sodium metal at approximately equal time intervals. Thus, for example, substantially constant amounts of metallic sodium may be introduced at regular intervals. The supply of air is so regulated that the temperature within the rotary tube furnace is maintained approximately within the range 180 to 230° C. After a certain amount of sodium monoxide has been produced and the small sodium monoxide beads have attained a definite size, a portion of the spherical product may be removed from the rotary tube and the remainder kept in the rotary tube as starting charge. Proceeding in this manner it is advisable, from time to time, to empty the rotary tube furnace completely, as otherwise the small pellets formed therein and not removed at the periodic removals would tend to grow to an undue extent and become too large for ordinary use.

If desired, partial emptying of the rotary tube furnace may be eliminated, in which case the oxidation process is continued with the addition of fresh sodium metal in portions until a desired amount of sodium monoxide in the form of beads of a desired size results. The rotary drum is then emptied completely and again freshly charged with fine-grained pellet-like sodium monoxide diluent material. The process is again operated until beads of the desired size are again produced, whereupon the tube is completely emptied.

It is possible to regulate the size of the sodium monoxide beads formed to a considerable extent by various procedures, such as regulation of the speed of rotation of the rotary tube furnace or by regulation of the degree of agitation. Another way of regulating the size of beads resulting is to stop the process and remove the charge completely at given time intervals, determined to give products of desired bead size. It will be generally found most desirable to manufacture products which correspond to particles of 10 to 100 mesh size.

The sodium monoxide of globular or approximately spherical size thus produced can be readily converted into sodium peroxide in accordance with known procedures involving further oxidation. This is readily carried out by oxidation with oxygen or air at a temperature not exceeding 450° C. in a rotary tube furnace. It has been found that the sodium monoxide of approximately spherical shape retains its globular or spherical condition during the further oxidation to sodium peroxide, thus producing a sodium peroxide of similar globular shape, one which is substantially free from dusty or pulverulent material. In this way sodium peroxide of size corresponding approximately to 10 to 100 mesh particle size can be prepared, a product which, when utilized for the preparation of bleaching solutions is not difficult to handle and readily dissolves without appreciable oxygen loss.

It should be remembered that the details of the invention, including numerical values and conditions, previously set forth herein as illustrative of the preferred embodiment should be construed as illustrative and not restrictive. The scope of my invention is to be determined in accordance with the appended claims and, as various changes may be made in the procedure as disclosed, it should not be restricted to special conditions or numerical amounts except as necessitated by the claims.

I claim:

1. A process for the preparation of sodium monoxide in substantially dust-free form wherein said monoxide is in the form of globular bodies of approximately spherical shape, which comprises introducing metallic sodium into a reaction vessel which contains, as diluent, sodium monoxide in the form of pellets of approximately spherical shape, maintaining the temperature within said reaction vessel at an elevated temperature below about 230° C., and oxidizing said metallic sodium to sodium monoxide.

2. A process for the preparation of sodium monoxide in substantially dust-free form wherein the monoxide is in the form of bead-like bodies of globular shape which comprises introducing metallic sodium into a reaction vessel which contains, as diluent, sodium monoxide in the form of small pellets of substantially spherical shape, maintaining an elevated temperature within the said reaction vessel, oxidizing said metallic sodium to sodium monoxide therein, and removing said resulting product of substantially globular shape substantially free from pulverulent material from said reaction vessel at spaced time intervals.

3. A process for the preparation of sodium monoxide in substantially dust-free form wherein the monoxide is in the form of globular bodies of pellet-like form which comprises introducing a relatively small amount of metallic sodium into a rotary tube furnace containing a much larger amount of sodium monoxide as diluent, said diluent sodium monoxide being in the form of globular bodies approximately spherical in shape, maintaining the temperature within the said rotary tube furnace at an elevated temperature below 230° C., and oxidizing said metallic sodium to sodium monoxide of globular form and substantially free of pulverulent material therein.

4. A process for the preparation of sodium monoxide in substantially dust-free form, said monoxide being in the form of spherical pellets and substantially free of pulverulent material, which comprises introducing metallic sodium into a reaction vessel containing, as diluent, sodium monoxide in the form of small pellets of substantially globular shape, the amount of metallic sodium introduced comprising not over 2% by weight of the sodium monoxide diluent present, maintaining the temperature within the said reaction vessel within the temperature range 180 to 230° C., and oxidizing said metallic sodium to sodium monoxide therein.

5. A process as defined in claim 4 wherein the sodium monoxide present in said reaction vessel is removed in portions from time to time, fresh amounts of metallic sodium being added to said charge in said reaction vessel, and said metallic sodium again oxidized to sodium monoxide substantially dust-free and comprising particles of globular form.

6. A process as defined in claim 3 wherein portions of metallic sodium are added at periodic intervals to the rotary tube furnace containing diluent sodium monoxide in the form of globular bodies substantially free from pulverulent material, and said portions of sodium oxidized therein to the desired product.

7. A continuous process for the preparation of sodium monoxide in substantially dust-free form, wherein said monoxide is in the form of pellets of substantially globular shape, which comprises introducing into a mass of diluent sodium monoxide in the form of dust-free pellets of approximately spherical shape a relatively small amount of metallic sodium, maintaining the temperature of said reaction mixture at an elevated temperature below 230° C., oxidizing said metallic sodium to sodium monoxide, removing at periodic intervals a portion of the sodium monoxide present, introducing into the reaction product at periodic time intervals successive small amounts of metallic sodium, and further oxidizing metallic sodium to sodium monoxide.

8. A process as defined in claim 4 wherein at the conclusion of the oxidation of metallic sodium to fine grained sodium monoxide, substantially free of pulverulent material, substantially all of said product is removed and the reaction vessel charged with fresh sodium monoxide substantially dust-free and comprising fine-grained globular material.

9. A process as defined in claim 3 wherein the size of the resulting product is regulated by adjustment of the speed of rotation of the rotary tube furnace.

10. A process as defined in claim 7 wherein external heating is eliminated and said elevated temperature is maintained by the introduction of molten metallic sodium at periodic intervals.

11. A process as defined in claim 4 wherein crusty material which forms within said reaction vessel is removed therefrom promptly upon its formation.

EWALD HERZOG.